United States Patent
Khandekar et al.

(10) Patent No.: US 8,571,132 B2
(45) Date of Patent: Oct. 29, 2013

(54) CONSTRAINED HOPPING IN WIRELESS COMMUNICATION SYSTEMS

(75) Inventors: Aamod Khandekar, San Diego, CA (US); Avneesh Agrawal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 905 days.

(21) Appl. No.: 11/315,744

(22) Filed: Dec. 21, 2005

(65) Prior Publication Data

US 2006/0146760 A1 Jul. 6, 2006

Related U.S. Application Data

(60) Provisional application No. 60/638,494, filed on Dec. 22, 2004.

(51) Int. Cl.
 *H04L 27/00* (2006.01)
 *H04L 27/06* (2006.01)
 *H04J 7/00* (2006.01)

(52) U.S. Cl.
 USPC .................. 375/295; 375/340; 370/208

(58) Field of Classification Search
 USPC ......... 375/259, 260, 261, 316, 340, 346, 347, 375/349, 295, 219, 222, 285, 296; 370/203, 370/208, 464, 480.491, 498, 500; 455/39, 455/68, 69
 See application file for complete search history.

(56) References Cited

U.S. PATENT DOCUMENTS

| | | | |
|---|---|---|---|
| 5,850,603 A | 12/1998 | Lantto et al. | |
| 6,480,522 B1 * | 11/2002 | Hoole et al. | 375/130 |
| 6,654,408 B1 * | 11/2003 | Kadous et al. | 375/148 |
| 7,257,406 B2 | 8/2007 | Ji | |
| 7,551,546 B2 * | 6/2009 | Ma et al. | 370/208 |
| 2002/0003774 A1 * | 1/2002 | Wang et al. | 370/208 |
| 2003/0026295 A1 * | 2/2003 | Baum et al. | 370/503 |
| 2003/0103446 A1 * | 6/2003 | Negishi et al. | 370/208 |
| 2003/0128658 A1 | 7/2003 | Walton et al. | |
| 2003/0169824 A1 * | 9/2003 | Chayat | 375/260 |
| 2003/0231725 A1 * | 12/2003 | Scarpa | 375/350 |

(Continued)

FOREIGN PATENT DOCUMENTS

| | | |
|---|---|---|
| JP | 2003110529 A | 4/2003 |
| JP | 2003204317 A | 7/2003 |

(Continued)

OTHER PUBLICATIONS

International Search Report—PCT/US2005/047647—European Patent Office—Apr. 24, 2006.

(Continued)

*Primary Examiner* — Sam K Ahn
*Assistant Examiner* — Vineeta Panwalkar
(74) *Attorney, Agent, or Firm* — Stanton Braden

(57) ABSTRACT

Embodiments described provide for channel estimation and resource allocation for a transmission to a wireless device. The frequency band is partitioned into at least two contiguous subbands. A determination is made whether it is desirable to transmit in a single subband or in more than one subband. The transmission is assigned to occur in either the single subband or to operate in more than one subband. If the transmission is restricted to one subband, the hop pattern is also restricted to subcarriers within the particular subband.

14 Claims, 9 Drawing Sheets

(56) References Cited

U.S. PATENT DOCUMENTS

| | | |
|---|---|---|
| 2004/0001554 A1* | 1/2004 | Sun et al. ................. 375/260 |
| 2004/0081123 A1 | 4/2004 | Krishnan et al. .......... 370/329 |
| 2004/0082356 A1* | 4/2004 | Walton et al. ............. 455/522 |
| 2004/0087282 A1 | 5/2004 | Ishikawa |
| 2004/0120300 A1* | 6/2004 | Saquib ...................... 370/342 |
| 2004/0136314 A1* | 7/2004 | Jung et al. ................. 370/203 |
| 2004/0190640 A1* | 9/2004 | Dubuc et al. .............. 375/260 |
| 2004/0203442 A1 | 10/2004 | Krishnan et al. ......... 455/67.11 |
| 2004/0218523 A1* | 11/2004 | Varshney et al. .......... 370/208 |
| 2004/0228267 A1* | 11/2004 | Agrawal et al. ........... 370/203 |
| 2005/0002421 A1 | 1/2005 | Ito et al. |
| 2005/0094738 A1* | 5/2005 | Park et al. ................. 375/260 |
| 2005/0157638 A1* | 7/2005 | Maltsev et al. ............ 370/203 |
| 2005/0245258 A1* | 11/2005 | Classon et al. ............ 455/434 |
| 2006/0045192 A1* | 3/2006 | Hayashi ..................... 375/260 |
| 2006/0135169 A1 | 6/2006 | Sampath et al. |

FOREIGN PATENT DOCUMENTS

| | | |
|---|---|---|
| JP | 2003229831 | 8/2003 |
| JP | 2003528527 A | 9/2003 |
| JP | 2004187226 A | 7/2004 |
| JP | 2004304590 | 10/2004 |
| JP | 2004350259 A | 12/2004 |
| JP | 2005151447 | 6/2005 |
| JP | 2005519567 A | 6/2005 |
| JP | 2006101019 | 4/2006 |
| JP | 2006140987 | 6/2006 |
| JP | 2006517759 | 7/2006 |
| JP | 2007533199 | 11/2007 |
| JP | 2008514124 | 5/2008 |
| TW | 177978 | 2/1992 |
| TW | 200302648 | 8/2003 |
| WO | WO0171928 | 9/2001 |
| WO | WO02060138 A2 | 8/2002 |
| WO | WO2004017537 | 2/2004 |
| WO | WO2004040813 | 5/2004 |
| WO | WO2004040827 | 5/2004 |
| WO | WO2004102816 | 11/2004 |

OTHER PUBLICATIONS

Written Opinion—PCT/US2005/047647—European Patent Office—Apr. 26, 2006.
International Preliminary Report on Patentability—PCT/US2005/047647—European Patent Office, Berlin—Mar. 12, 2007.
Taiwan Search Report—TW094146433—TIPO—Oct. 28, 2011.

* cited by examiner

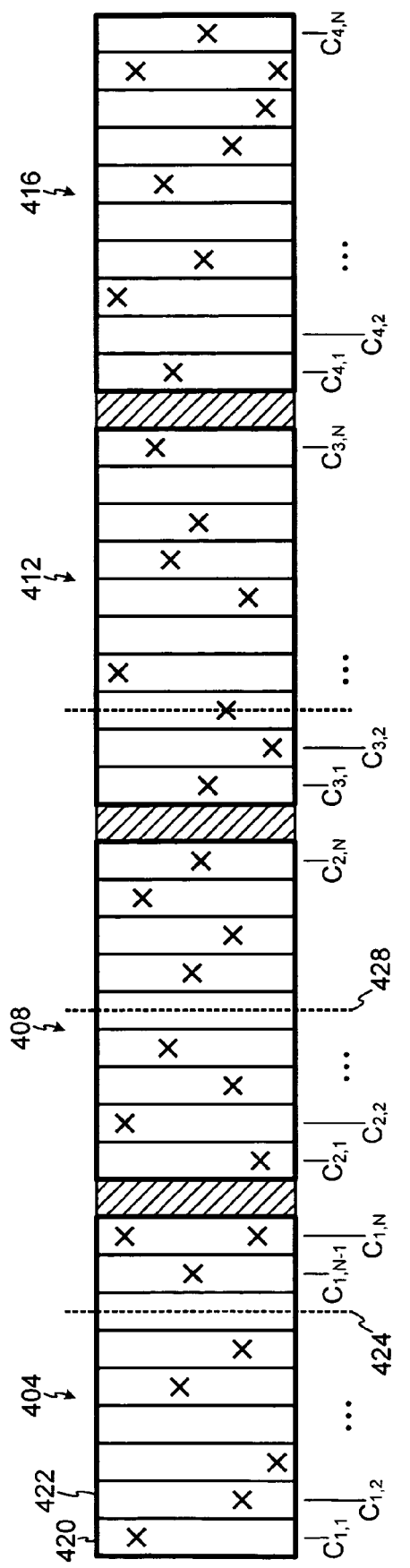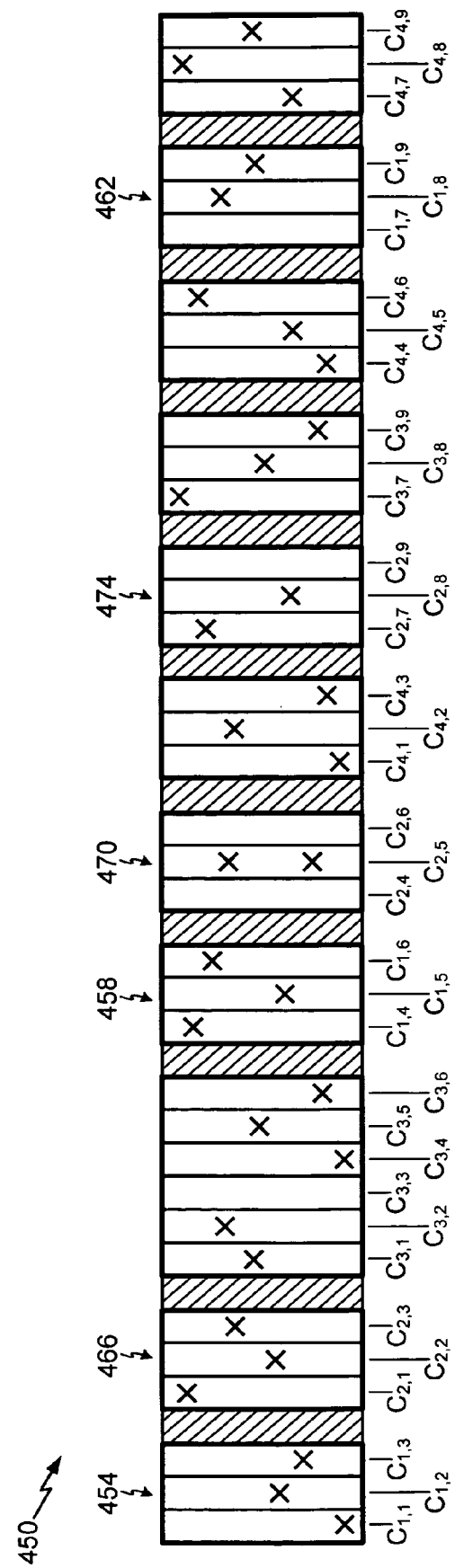
Figure 4A
Figure 4B

CONSTRAINED HOPPING IN WIRELESS COMMUNICATION SYSTEMS

CROSS-REFERENCE TO RELATED APPLICATIONS

This application claims benefit under 35 U.S.C. §119(e) from U.S. Provisional Patent application Ser. No. 60/638,494 entitled "Contiguous Hopping in an OFDMA Communication System" and filed Dec. 22, 2004, the entirety of which is hereby incorporated by reference.

BACKGROUND

I. Field

The disclosure generally relates to communication systems and, amongst other things, to constrained hopping and channel estimation in wireless communication systems.

II. Description of the Related Art

In digital communications, information is translated into digital data referred to as bits. A transmitter modulates an input bit stream into a waveform for transmission over a communication channel and a receiver demodulates the received waveform back into bits, thereby recovering the information. In an ideal communication system, the data received would be identical to the data transmitted. However, in reality, distortions or noise may be introduced during the transmission of data over a communication channel from the transmitter to the receiver. If the distortion is significant, the information may not be recoverable from the data received at the receiver.

Orthogonal Frequency Division Multiplexing (OFDM) is a modulation technique that effectively partitions the overall system bandwidth into a number of (N) orthogonal subcarriers. The subcarriers are also commonly referred to as tones, bins, and frequency channels.

OFDM is widely used in various communication systems. For example, an orthogonal frequency division multiple access (OFDMA) system utilizes OFDM and can support multiple users. The N subcarriers may be used for data and pilot transmission in various manners, depending on the system design. For example, the OFDMA system may partition the N subcarriers into multiple disjoint groups of subcarriers and allocate each subcarrier group to a different user. Multiple users can then be supported simultaneously via their assigned subcarrier groups.

Data is often distorted during transmission. To mitigate the effects of distortion, channel estimation is one technique used to compensate for the distortion introduced in data during its transmission. Channel estimation is sometimes accomplished by use of a broadband pilot signal, where a fraction of the total available tones are reserved for pilot symbols. These pilot symbols are typically spaced equally throughout the band for optimal performance. At the receiver, the channel response can then be estimated by processing the data received in a distorted manner. If a user needs to estimate multiple channels, such as a user in a multiple-input multiple-output communication system (MIMO), the system overhead increases. For example, in a four antenna MIMO transmission, three additional broadband pilot signals need to be transmitted.

A typical MIMO system employs multiple ($N_T$) transmit antennas and multiple ($N_R$) receive antennas for data transmission and is denoted as an ($N_T$, $N_R$) system. A MIMO channel formed by the $N_T$ transmit and $N_R$ receive antennas may be decomposed into $N_S$ spatial channels, where $N_S \leq \min\{N_T, N_R\}$, as described below. $N_S$ data streams may be transmitted on the $N_S$ spatial channels. The MIMO system can provide increased transmission capacity if the $N_S$ spatial channels created by the multiple transmit and receive antennas are used for data transmission.

The transmission capacity of each spatial channel is dependent on the signal-to-noise-and-interference ratio (SINR) achieved by that spatial channel. The SINRs for the Ns spatial channels are dependent on the channel conditions and may further be dependent on the manner in which the data streams are recovered at the receiver. In one conventional MIMO system, a transmitter encodes, modulates, and transmits each data stream in accordance with a rate selected based on a model of a static MIMO channel. Good performance can be achieved if the model is accurate and if the MIMO channel is relatively static (i.e., does not change much over time). In another conventional MIMO system, a receiver estimates the MIMO channel, selects a suitable rate for each spatial channel based on the channel estimates, and sends $N_S$ selected rates for the $N_S$ spatial channels to the transmitter. The transmitter then processes $N_S$ data streams in accordance with the selected rates and transmits these streams on the $N_S$ spatial channels. The performance of this system is dependent on the nature of the MIMO channel and the accuracy of the channel estimates.

When a user's symbols are transmitted in a hopping pattern over the full band, channel estimations need to be carrier out over the entire band. This is exacerbated in the case of a MIMO user, where broadband pilot signals are needed for every channel estimated. Further, having users operate over the entire band reduces channel variations and thus can diminish multi-user gains.

Accordingly, operating users across the available frequency band increases overhead. Further, it does not take advantage of scheduling users in favorable channel conditions. Therefore, there is a need for more efficient methods and systems for allocating resources.

SUMMARY

In certain aspects, in a wireless communication system operating over a given frequency band, a method for channel estimation comprises receiving a plurality of pilot signals in more than subband of a frequency band and estimating a channel response based on some of the plurality of pilot signals received in one subband for that one subband.

In other aspects, in a wireless communication system operating in a given frequency band, a method of resource allocation for a transmission comprises determining whether it is desirable for a transmission to a user to be in a single subband or in more than one subband; wherein each subband includes non-overlapping subcarriers with respect to any other subband, and assigning the transmission to occur in either the single subband or to operate in more than one subband based upon the determination.

Other aspects may include means that provide the above functionality and other structures and methods to produce similar results.

BRIEF DESCRIPTION OF THE DRAWINGS

Various embodiments will be described in detail with reference to the following drawings in which like reference numerals refer to like elements, wherein:

FIG. 4A illustrates the structure of a partitioned frequency band with contiguous subbands 400;

FIG. 4B illustrates the structure of a partitioned frequency bandwidth having hybrid subbands 450;

DETAILED DESCRIPTION

Figure 1:
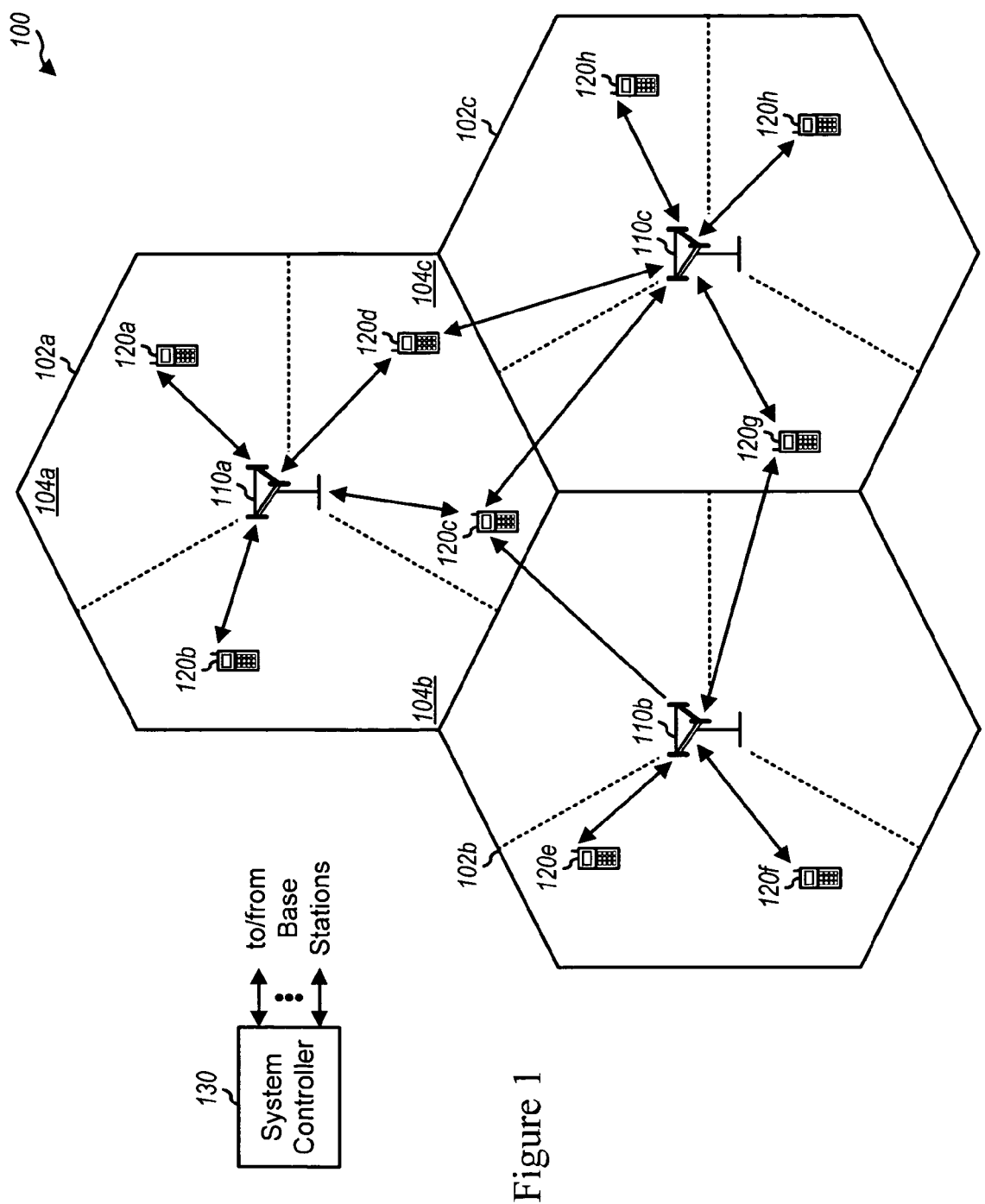
FIG. 1 illustrates an exemplary OFDMA system 100 that supports a number of users.

Accordingly, the embodiments described provide the ability to schedule users in a frequency band partitioned into one or more subbands, and to estimate a channel response based on pilot signals received in one or more subbands by each user. In some aspects, if the subcarrier of interest is near the edge of a subband, at least a portion of pilot signals received in neighboring subbands may be utilized to estimate the channel response.

Embodiments described also provide resource allocation for a transmission of a wireless device. The frequency band is partitioned into at least two subbands, which may or may not be contiguous. A determination is made whether it is desirable to transmit in a single subband or in more than one subband to, or from, a given user. The transmission is assigned to occur in either a single subband or to operate in more than one subband.

In the description below, the embodiments may be described as a process which is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to a calling function or a main function.

As disclosed herein, the term "communication channel" refers to both wireless and wireline communication channels. Examples of wireless communication channels are radio, satellite and acoustic communication channel. Examples of wireline communication channels include, but are not limited to optical, copper, or other conductive wire(s) or medium. The term "look-up table" refers to data within a database or various storage media. Storage medium may represent one or more devices for storing data, including read only memory (ROM), random access memory (RAM), magnetic disk storage mediums, optical storage mediums, flash memory devices and/or other machine readable mediums for storing information. The term "machine readable medium" includes, but is not limited to portable or fixed storage devices, optical storage devices, wireless channels and various other mediums capable of storing, containing or carrying instruction(s) and/or data. Also, for purposes of explanation, the embodiments will be described with reference to Orthogonal Frequency Division Multiplexing (OFDM) systems. However, it will be well understood that the invention can be applied to other types of systems that require channel estimation.

OFDM is an example of a multi-carrier communication technique that is well known. Generally, OFDM is a digital modulation technique that splits a signal into multiple sub-signals which are transmitted simultaneously at different frequencies. OFDM uses overlapped orthogonal signals to divide a channel into many sub-channels that are transmitted in parallel. Because OFDM allows high data rate transmission over degraded channels, OFDM has been successful in numerous wireless applications, such as in high speed wireless local area networks (LANs).

An orthogonal frequency division multiple access (OFDMA) system utilizes OFDM and can support multiple users simultaneously. The frequency bandwidth of operation is used for the transmission of signals is subdivided into a plurality of frequency subcarriers. By appropriately designing modulation symbol periods, adjacent frequency subcarriers are respectively orthogonal to each other. Orthogonality is a property of a set of functions such that the integral of the product of any two members of the set taken over the appropriate interval is zero. More specifically, orthogonal channels or frequencies do not interfere with each other. As a result, orthogonality allows a receiver to demodulate a selected subcarrier without demodulating other subcarriers that are transmitted in parallel through multiplexed communication channels. As a result, there is no cross-talk among subcarriers and inter-symbol-interference (ISI) is significantly reduced.

If there is an accurate estimate of the channel characteristics that can be used to adjust the received signal, the OFDM system performance can be improved by allowing for coherent demodulation. Accordingly, training sequences known as pilot symbol patterns or training symbols are transmitted by the transmitter. The training symbols are known to the receiver such that the receiver is able to perform channel estimation.

FIG. 1 shows an exemplary OFDMA system 100 that supports a number of users. System 100 includes a number of base stations 110 that support communication for a number of terminals 120. A base station is a fixed station used for communicating with the terminals and may also be referred to as an access point, a Node B, or some other terminology. Terminals 120 are typically dispersed throughout the system, and each terminal may be fixed or mobile. A terminal may also be referred to as a mobile station, a user equipment (UE), a wireless communication device, or some other terminology. Each terminal may communicate with one or more base stations on the forward link and/or one or more base stations on the reverse link at any given moment. This depends on whether or not the terminal is active, whether or not soft handoff is supported, and whether or not the terminal is in soft handoff. The forward link (i.e., downlink) refers to the communication link from the base station to the terminal, and the reverse link (i.e., uplink) refers to the communication link from the terminal to the base station.

A system controller 130 couples to base stations 110 and may perform a number of functions such as (1) coordination and control for base stations 110, (2) routing of data among these base stations, and (3) access and control of the terminals served by these base stations.

Each base station 110 provides coverage for a respective geographic area 102. For simplicity, the coverage area of each base station is often represented by an ideal hexagon. To increase capacity, the coverage area of each base station may be partitioned into multiple sectors 104. For example, each cell may, or may not, be partitioned into three sectors, as shown in FIG. 1. In this case, for simplicity, each sector of a sectorized cell may be represented by an ideal 120° wedge that is ⅓ of the cell. Each sector may be served by a corresponding base transceiver subsystem (BTS). For a sectorized cell, the base station for that cell typically includes all of the BTSs for the sectors of that cell. The term "sector" can refer to a BTS and/or its coverage area, depending on the context in which the term is used. For simplicity, in the following description, the term "base station" is used generically for both a fixed station that serves a cell and a fixed station that serves a sector.

It should be noted that unsectorized cells, and cells having different sized and/or a different number of sectors may also be utilized.

Figure 2:
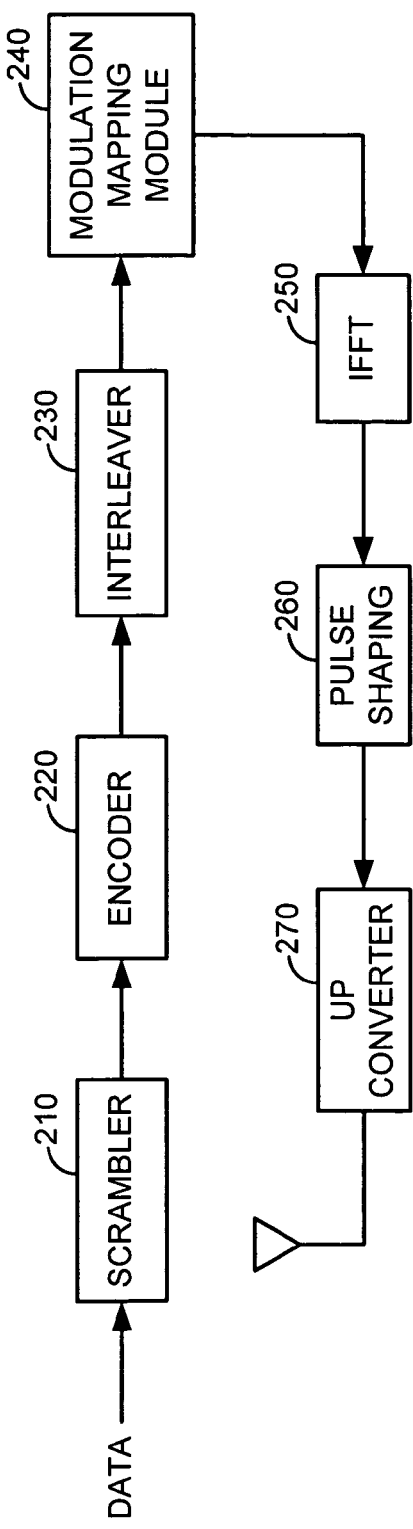
FIG. 2 illustrates aspects of a transmitter 100 for use in OFDM systems.

FIG. 2 shows one embodiment of a transmitter 200 for use in OFDM systems. Transmitter 200 comprises a scrambler 210, an encoder 220, an interleaver 230, a modulation mapping module 240, an inverse fast fourier transform (IFFT) module 250, a pulse shaping module 260 and an up-converter 270. Transmitter 200 receives a data packet and the data rate at which the packet is to be transmitted. Scrambler 210 scrambles and encoder 220 encodes the received packet. Encoder 220 may be a convolutional encoder or some other known encoder that allows error correction encoding.

The encoded bits are grouped into a block, and each block is then interleaved by interleaver 230 and mapped to a sequence of modulation symbols by modulation mapping module 240. The encoded and interleaved bit stream of a selected length is grouped into various numbers of bits depending upon the modulation. Typically, the bit stream is grouped into one of 1, 2, 4 or 6 bit(s) and converted into a sequence of complex numbers representing a modulation symbol in Bi-phase shift keying (BPSK) modulation, Quadrature phase shift keying (QPSK) modulation, 16. Quadrature amplitude modulation (QAM) or 64-QAM respectively. BPSK, QPSK and QAM are modulation techniques well known in the art and will not be discussed in detail. It should be noted that other modulation formats may also be utilized, in addition to, or in lieu of the modulation formats described above.

Each OFDM symbol is then assigned to a subcarrier and inverse fast Fourier transformed. This results in time-domain samples of a single OFDM symbol. Here, a cyclic prefix can be added to each symbol. Pulse shaping may be performed by pulse shaping module 260, if pulse shaping functionality is provided by the transmitter 200, and the symbols are up-converted by up-converter 270 for transmission through a communication channel. Here, a programmable pulse shaping may be used.

In addition to the modulation symbols, the data packet may comprise other information. For example, headers, leadings and/or preambles may be appended as necessary to the packet before the scrambling. The header information may comprise the data rate and packet length information. The contents of the header are typically not scrambled.

Transmission of pilot signals are used to obtain an estimate of the channel response. The more pilot signals used, the better the estimate of channel response. However, pilot transmissions add a significant amount of overhead. Accordingly, use of pilot transmissions need be balanced with overhead considerations. Further, pilot transmissions across the entire band of interest add to overall noise in the system. If use of pilots are minimized, the channel response may often be inaccurate and/or unreliable, thereby failing to give satisfactory performance.

Figure 3:
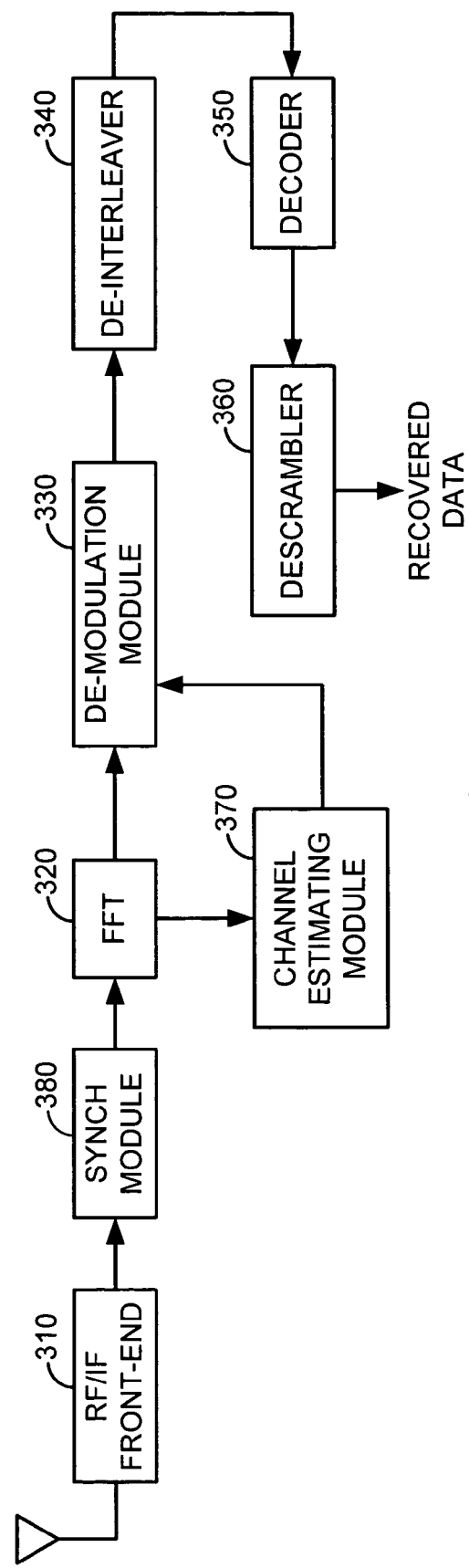
FIG. 3 illustrates aspects of a receiver 200 for use in OFDM systems.

FIG. 3 illustrates one embodiment of a receiver 300 for use in OFDM systems. The receiver 300 comprises a radio frequency/intermediate frequency (RF/IF) front-end 310, a synchronizing module 380, a fast fourier transform (FFT) module 320, a de-modulation module 330, a de-interleaver 340, a decoder 350, a descrambler 360 and a channel estimating module 370. It should be noted here that FIG. 2 shows a simplified block diagram of a receiver. A more typical commercial receiver may comprise additional elements such as a storage medium (not shown) and a processor (not shown) to control one or more RF/IF front-end 310, synchronizing module 380, FFT module 320, de-modulation module 330, de-interleaver 340, decoder 350, descrambler 360 and channel estimating module 370.

RF/IF front end 310 receives data through a communication channel. The signal is then input to FFT module 320 and converted from time domain to frequency domain. FFT is performed after removing the cyclic prefix as necessary. Channel estimating module 370 receives the frequency domain signal and provides a channel estimate. The frequency domain signal also may be input to a phase locked loop (PLL) that provides phase error correction in adjusting the received signal. The demodulated signal is de-interleaved by de-interleaver 340 and decoded by decoder 350. Decoder 350 may be a Viterbi decoder. The decoded data is then descrambled by descrambler 360 to recover the original data information. An additional buffer may also be implemented to hold the samples while the signal field is being decoded.

After FFT processing, the preambles are obtained and used to perform channel estimation for each subcarrier. Initial channel estimate(s) can be obtained based on the pilot signals.

Channel estimating module 370 performs channel estimation the frequency domain signal. For example, after FFT processing, a signal for a subcarrier can be represented in Equation [1] as follows, $$Y_n = H_n X_n + N_n \quad [1]$$

However, other approaches and techniques may also be utilized.

FIG. 4A illustrates the structure of a partitioned frequency band 400 into contiguous subbands 404, 408, 412 and 416. As by example, FIG. 4A illustrates an embodiment having four contiguous subbands 404, 408, 412 and 416. Depending upon design constraints or other reasons, any number of subbands may be used. Each of the subbands comprises a number of subcarriers, which may be equal or unequal in number, such as subcarriers 420, 422, and so on.

For example, a 5 MHz system may have 512 total subcarriers. If the total bandwidth is divided into four contiguous subbands, each of the four subbands 404, 408, 412 and 416 are partitioned into 1.25 MHz, with each having 128 subcarriers. In certain aspects, each of the subbands may be divided into a number that is a power of two such that the number of subcarrier in the individual subbands is also a power of two. This property is useful in taking fast Fourier transforms (FFTs) and inverse fast Fourier transforms (IFFTs) over the individual subbands, which is useful for channel estimation purposes.

By partitioning the total bandwidth 400 into a plurality of subbands, hopping patterns maybe restricted such that subcarriers in a given subband always hop within the same subband. Thus, users that are signed to only one subband need only determine channel estimation over that given subband, and only using the pilot tones of that subband. For example, if a different channel tree is used per subband, a user may be scheduled on that channel tree, so long as they are assigned to that subband.

As indicted above, each of the subbands maybe divided into a plurality of subcarriers. For example, subband 404 comprises subcarriers $C_{1,1}, C_{1,2}, \ldots C_{1,N-1}$, and $C_{1,N}$. Similarly, subbands 408, 412 and 416 are divided into plurality of carriers.

Channel estimation may be performed by the use of a common broadband pilot signal. A fraction of the tones are reserved for pilot symbols. FIG. 4A represents these pilot symbols with the letter "X". These pilot symbols are typically spaced, e.g. equally, throughout the total bandwidth 400 for optimal performance depending on system design. Further, in some cases the pilots may be transmitted along random, pseudorandom, or hopped patterns.

A problem that may be incurred when a user estimates a channel over a given subband, is that large channel estimation error maybe incurred at subband carriers near the edge of the subband. For this purpose data for subcarriers near the edge of the band maybe intentionally blanked out. In other aspects, if a user is able to use excess pilots in neighboring subbands, channel estimation maybe improved at subcarriers at the edge of a given subband by use of these pilots from other subbands. In this case, the blank carriers may not be necessary.

For example, if one were estimating the channel for subcarrier $C_{2,1}$, The user would use the pilot signals in subband 408 to estimate the channel response. However, large error maybe introduced when considering pilot signal received in subcarriers far away in frequency then the given subcarrier. For example, the pilot signal in subband subcarrier $C_{2,N}$ is far away in frequency from subcarrier $C_{2,1}$. However, subcarrier $C_{1,N}$ is adjacent to subcarrier $C_{2,1}$, but in a different subband (404). Similarly, subband $C_{1,N-1}$ is relatively close in frequency then the two subcarrier $C_{2,1}$. In this embodiment, pilot signals received in the neighboring subband maybe used for some predetermined difference in frequency. In this case, line 424 represents a boundary by which subcarrier $C_{2,1}$. Considers in estimating its channels response. In an alternate embodiment, pilot signals even within this subband of interest can be ignored if considered to be too far in frequency from the subcarrier of interest. In this embodiment, subcarriers lying outside of line 428 are not considered when determining the channel response of subcarrier $C_{2,1}$.

FIG. 4B illustrates the structure of a partitioned frequency bandwidth having hybrid contiguous subbands 450. In this embodiment, certain subcarriers are grouped to be contiguous. However, the smaller groups of contiguous subbands maybe non-contiguous from other smaller groups of subcarriers within the subband. For example, the $C_1$ subband is represented by groups 454, 458, and 462, a second subband may represent by subcarrier groups 466, 470, and 474. In the same manner as described in respect to FIG. 4A, estimating the channel response to a given subcarrier maybe accomplished using pilot signals received in that portion of the subband, or in neighboring subbands as well.

In certain aspects, hopping may be provided by scheduling transmissions to, or from, a user so that consecutive transmission periods, or groups of periods, use different subcarriers, e.g. subcarriers within different subbands. These may be provided by using patterns and pattern generators that are known.

Figure 5:
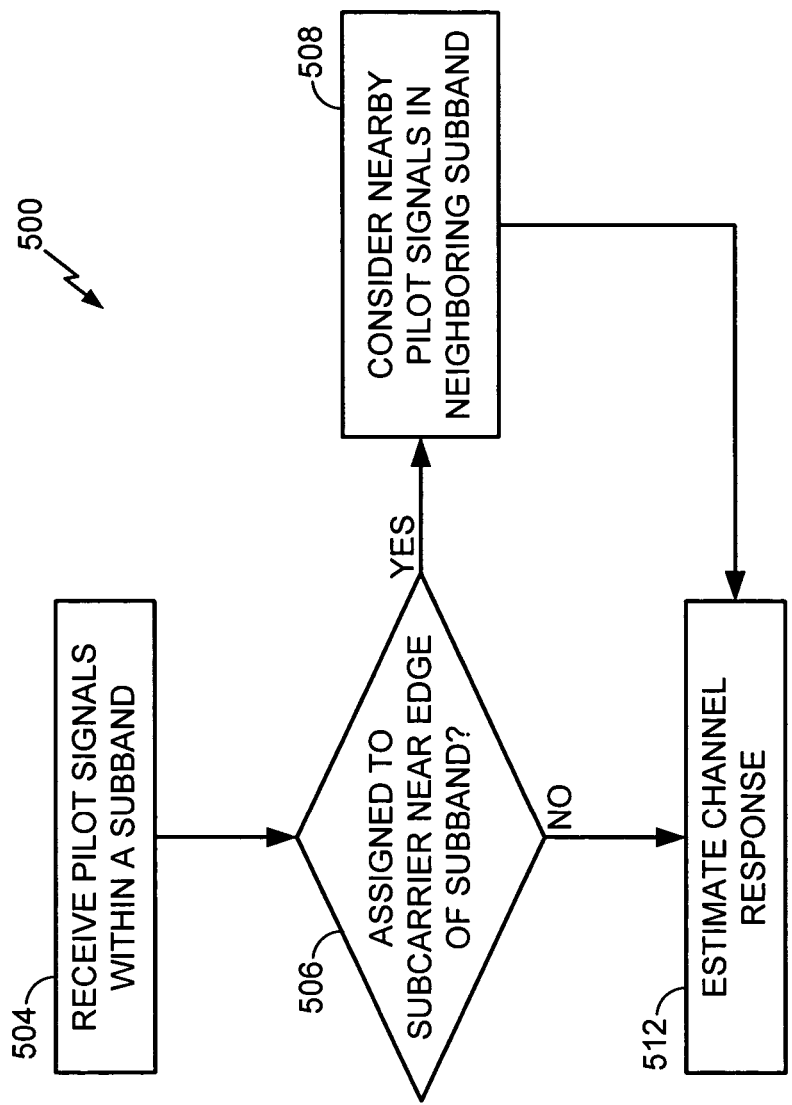
FIG. 5 illustrates a process 500 of channel estimation where pilot signals received outside of a given subband may be used in the channel estimation process.

FIG. 5 illustrates a process 500 of channel estimation where pilot signals received outside of a given subband may be used in the channel estimation process. Pilot signals are received 504 within a given subband. A determination is made as to whether the subcarrier of interest is near the edge of a subband. What subcarriers are deemed to be "near" may vary based on network deployment, channel conditions or other factors. If the given carrier is near the edge of a subband, pilot signals received in the neighboring subband are utilized 508. The pilot signals of the entire neighboring subband or any predetermined portion of the neighboring subband maybe utilized to estimate the channel response 512. If the assigned subcarrier is not near the edge of subband, neighboring pilots need not be considered and the channel response maybe estimated 512 without the use of pilot signals in neighboring subbands. Typically, a channel estimate for the entire subband is used because a user's subcarriers are distributed throughout the subband. Thus, pilots in neighboring subbands are used to estimate channel for tones near the edge. Pilots within the subband are used for all other tones."

Frequency reuse schemes, such as Active Set Based Restricted (ASBR), may use contiguous subbands as their reuse sets. ASBR techniques are described in more detail in the patent application entitled "Feedback to Support Restrictive Reuse", Ser. No. 11/020,707, filed Dec. 22, 2004, and patent application "Restrictive Reuse Set Management", Ser. No. 11/021,189, filed Dec. 22, 2004, assigned to the same assignee as the present application, and expressly incorporated by reference herein. To combat inter-cell interference, and to improve the signal to noise ratio, a wireless system may employ a frequency reuse scheme, whereby not all frequency bands available in the system are used in each cell.

For example, a system may employ a 7-cell reuse pattern and a reuse factor of K=7. For this system, the overall system bandwidth W is divided into seven equal frequency bands, and each cell in a 7-cell cluster is assigned one of the seven frequency bands. Each cell uses only one frequency band, and every seventh cell reuses the same frequency band. With this frequency reuse scheme, the same frequency band is only reused in cells that are not adjacent to each other, and the inter-cell interference observed in each cell is reduced relative to the case in which all cells use the same frequency band. However, a large reuse factor represents inefficient use of the available system resources since each cell is able to use only a fraction of the overall system bandwidth. The same reuse schemes may be applied to the pilot signals as well. As such, the improvements found in the signal to noise ratio with respect to transmitted data is also be seen by transmitted pilots.

When a user is restricted to use a certain portion of the bandwidth, his out-of-band emissions are substantially lower. The contiguous hopping scheme can be used on the reverse link to gain this benefit. To gain additional frequency diversity as well, the user can be assigned to a single subband at any given time, but this subband can be varied over time.

Figure 6:
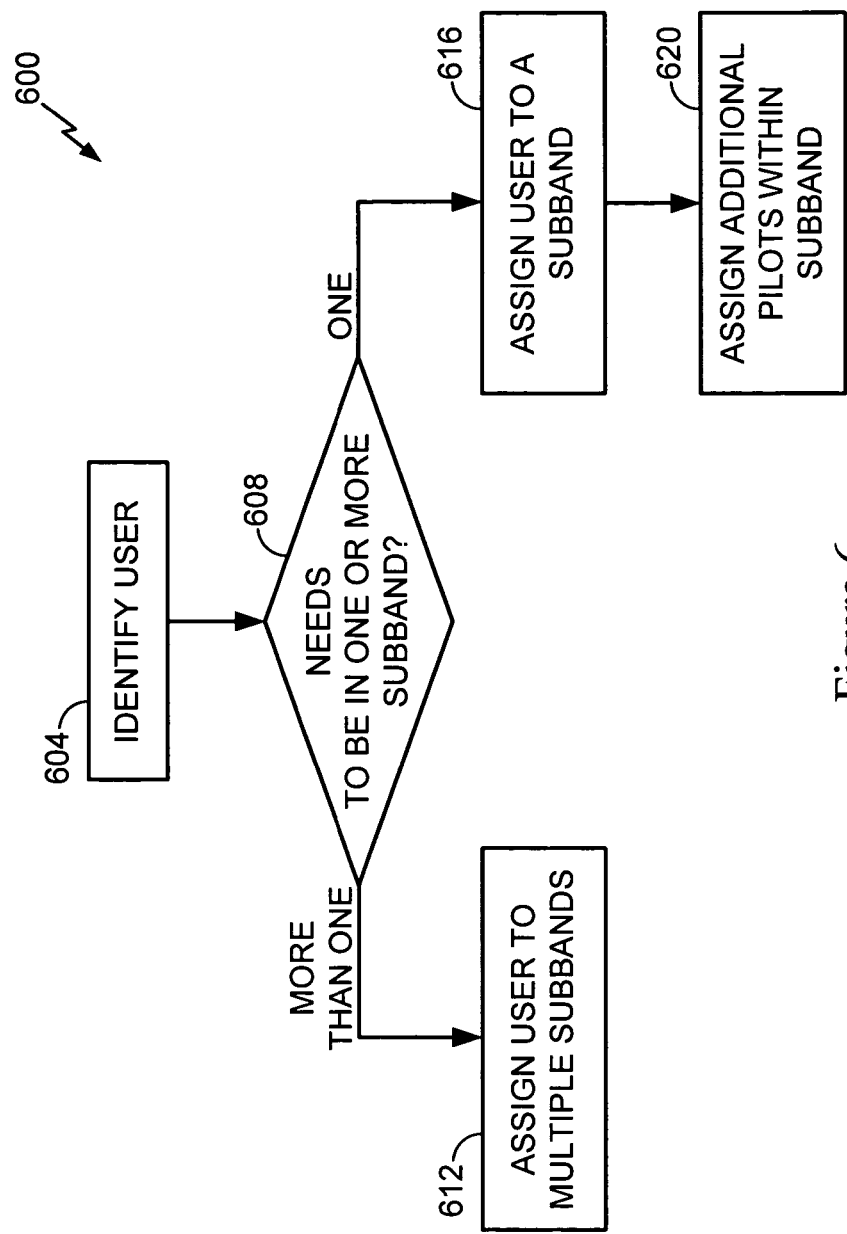
FIG. 6 illustrates a process 600 by which users are allocated to given subbands.

FIG. 6 illustrates a process 600 by which users are allocated to given subbands. There may be circumstances in which it is desirable to have users operate in more then one subband. Conversely, there may be circumstances in which it is desirable to have users operating only in a given subband. For example MIMO users need to estimate multiple spatial channels. Thus, a broadband pilot signal would be needed for every spatial channel estimated. For a four antenna MIMO transmission, four broadband pilot signals have to be transmitted. Therefore, it may be beneficial for MIMO users to be assigned to a specific subband, which may vary, or be the same, for all of the spatial channels utilized. The additional pilot tones that are needed to estimate the extra channels of a MIMO user only need to be allocated within that given subband. Thus, bandwidth overhead is significantly reduced.

In another example, latency-sensitive users require frequency diversity. Therefore, latency sensitive user maybe assigned to subcarriers in multiple subbands. Since less frequency diversity is available over an individual subband, the potential for multi-user diversity gains is raised. Thus, having latency sensitive users operate in multiple subbands increases frequency diversity and reduces multi-user diversity gains.

The process by which such users may be processed is described in FIG. 6. The needs of a user are identified 604. A determination 608 is made as to whether the user needs to be in more then one subband. If it is determined that it is preferable to have the user operate in more then one subband, the user is assigned to operate in multiple subcarriers in multiple subbands 612. This process represents what may occur for a latency sensitive user. On the other hand, if it is determined that the user need only operate in one subband, the user is assigned to subcarriers within the one subband 616. This maybe an example of a MIMO user. Thus, in the MIMO case, additional pilot signals may be assigned 620 with the chosen subband.

Figure 7:
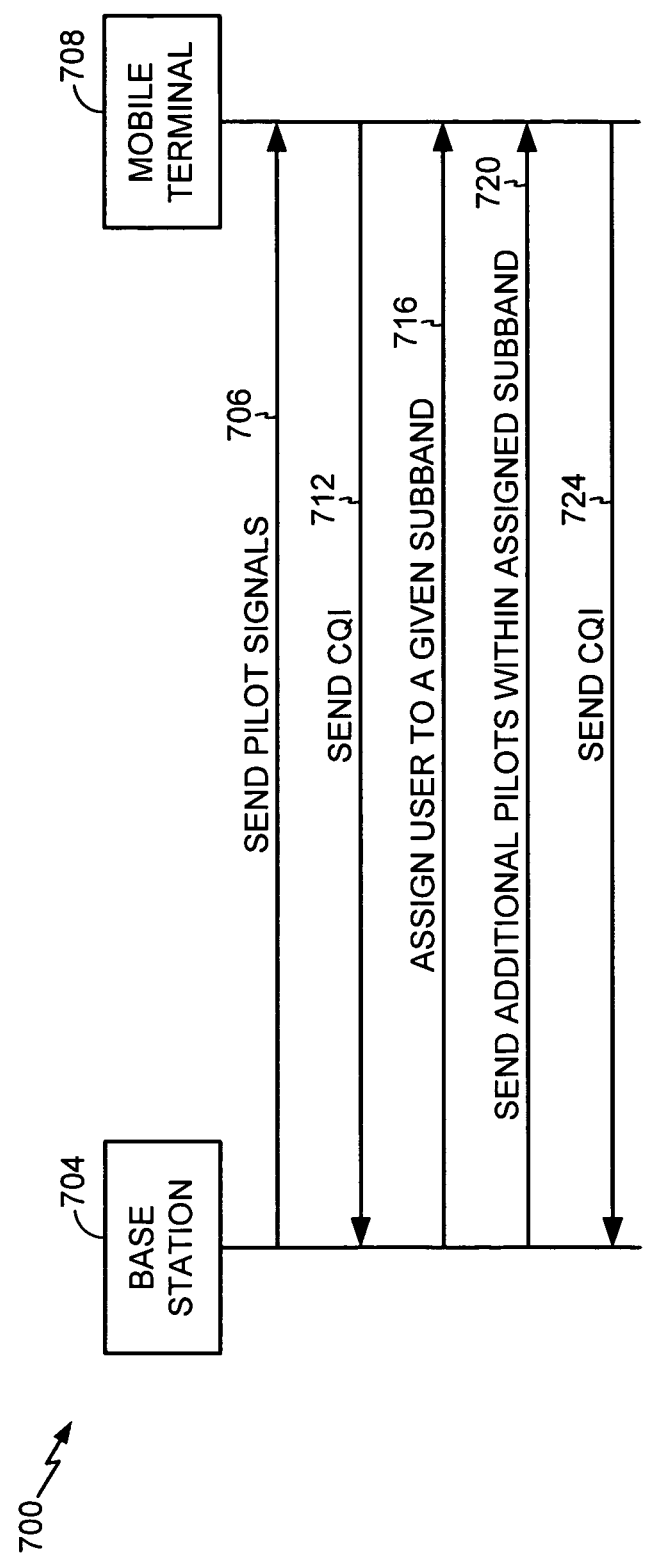
FIG. 7 illustrates a process 700 of assigning a MIMO user.

FIG. 7 illustrates a process 700 of assigning a MIMO user. The base station 704 sends pilot signals across the entire bandwidth, which is received by a mobile terminal 708. The mobile terminal 708 receives the pilot signals and determines 712 a channel quality indicator (CQI) which is then sent back to the base station. Depending upon conditions and desirability, different representations of CQI maybe sent to the base station.

An option for computing and transmitting the CQI include sending the CQI for each subband to the base station. The base stations can then take the best possible decision as to scheduling and rate prediction. Another option is to transmit the CQI for the last subband used. Or, if more then one subband is used, then sending the CQI over, the combined subbands. This method decreases the overhead but must be balanced with potential inaccuracy in the rate prediction algorithm when the base station wants to switch the user's subband. Another option is to transmit the CQI for the best subband for the user. This requires indication for the subband index as well. Another option is to transmit what the handset observes as being the best possible subband. Additionally, multiple CQIs for different subbands may be utilized.

Upon receipt of CQI from the mobile terminal, the base station 704 assigns 716 the user to a given subband. In addition, the base station sends 720 additional pilot signals within the assigned subband. Mobile terminal 708 then sends 724 the CQI corresponding to the additional pilot signals assigned within the chosen subband.

Figure 8:
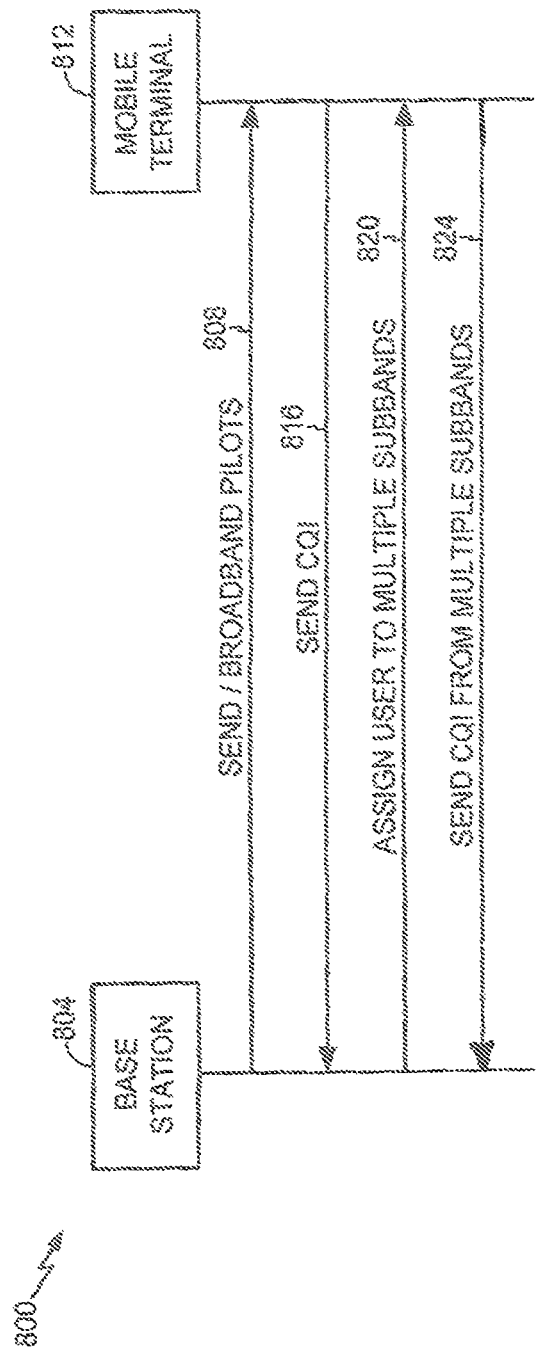
FIG. 8 illustrates the process of assigning 800 latency sensitive users.

FIG. 8 shows the process of assigning 800 latency sensitive users. Base station 804 sends 808 broadband pilot signals across the entire frequency band to the mobile terminal 812. The CQI is sent 816 back to the base station 804. The base station 804 then assigns 820 the user to operate within multiple subbands. In those multiple subbands, mobile terminal determines the CQI of pilot signals received in the multiple subbands and sends 824 the CQI's from the subbands of interest back to base station 804.

Figure 9:
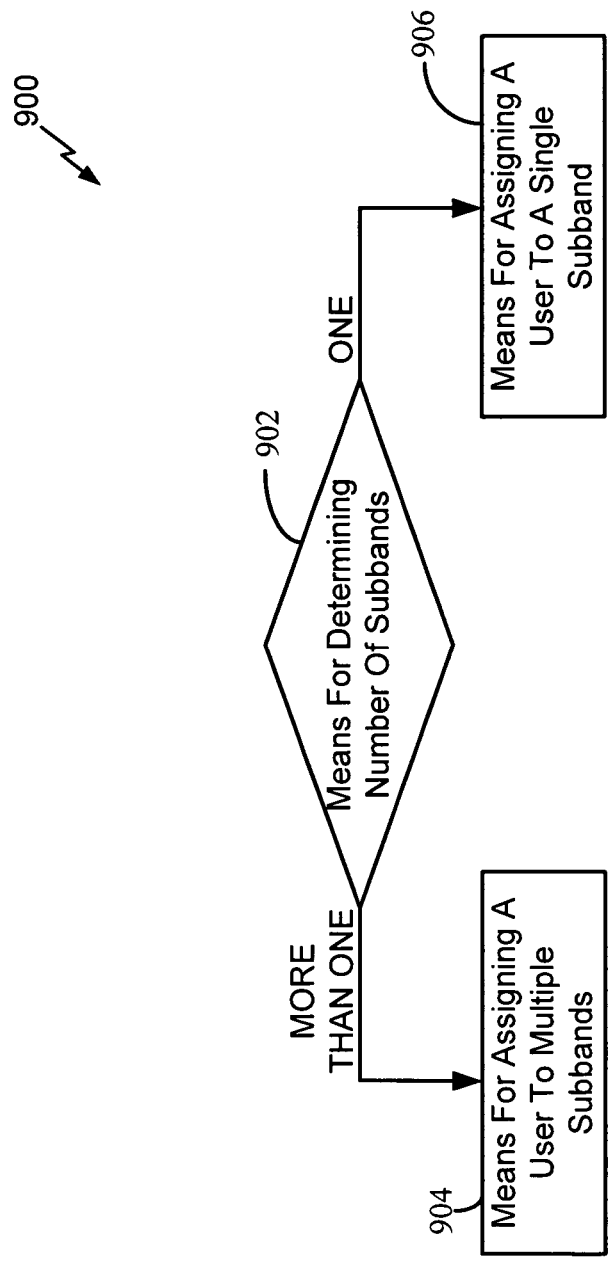
FIG. 9 illustrates a structure for scheduling.

Referring to FIG. 9 a structure 900 for scheduling is shown. The scheduling structure includes means 902 for determining a number of subbands to schedule a user on. This may be based upon whether the user is a MIMO user, the latency of the user, combinations thereof, or other approaches. Then, means 904 for scheduling a user on multiple subbands or means 906 for scheduling a user on a single subband may be utilized as appropriate. The means 904 and 906 may also comprise a single means.

Figure 10:
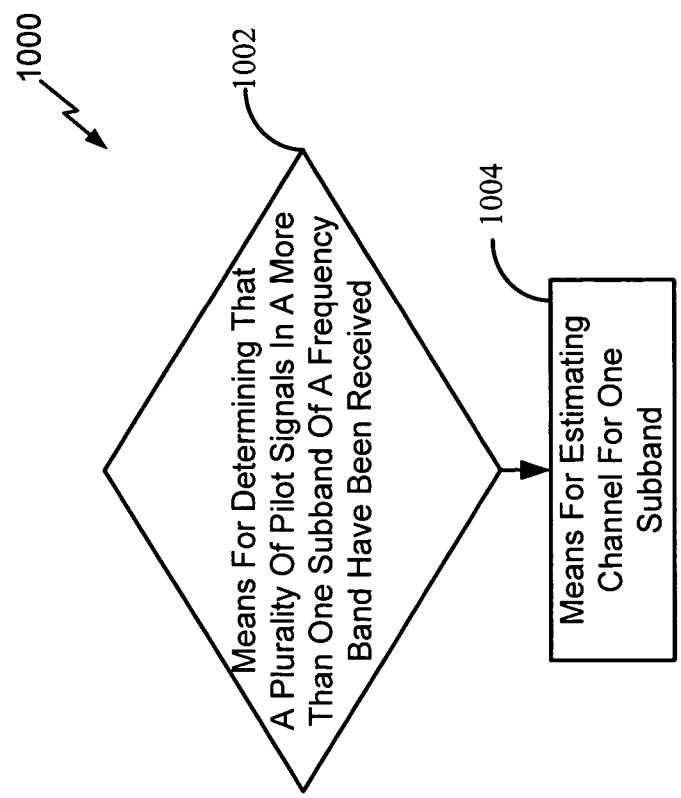
FIG. 10 illustrates a structure for channel estimation.

Referring to FIG. 10 a structure 1000 for channel estimation is shown. The structure 1000 includes means 1002 for determining that a plurality of pilot signals in more than one subband of a frequency band have been received and means 1004 for estimating a channel response based on some of the plurality of pilot signals received in one subband for that one subband. Additionally, means for using at least a portion of pilot signals received in neighboring subbands to estimate the channel response in the given subband may be included in means 1004.

The pilot and data transmission schemes described herein may be implemented by various means. For example, these techniques may be implemented in hardware, software, or a combination thereof. For a hardware implementation, the elements used to perform the processing at the transmitter and receiver units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the processing at the transmitter and receiver units for the transmission schemes described herein may be implemented with modules (e.g., procedures, functions, and so on) that perform the functions described herein. The software codes may be stored in memory and executed by processors. The memory units may be implemented within or external to the processors, in which case they can be communicatively coupled to the processors via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

What is claimed is:

1. In a wireless OFDMA communication that estimates multiple channels in a MIMO system operating over a given frequency band, wherein channel estimation is more efficient for allocating resources when users' symbols are transmitted in a hopping pattern over the full band, a method comprising:
   a) transmitting a user's symbols in a hopping pattern over the full broadband;
   b) receiving from a receiver a plurality of pilot signals in a more than one subband and a neighboring subband of a frequency band having an in range portion defined by a contiguous range of frequencies adjacent to the edge of the subband and an out of range portion defined by the remaining frequencies in the neighboring subband;
   c) receiving a channel quality indicator (CQI) indicative of channel quality of each subband observed in a wireless device;
   d) estimating a channel response-based on some of the plurality of pilot signals in more than one subband and the pilot signal in the range portion of the neighboring subband; and
   e) assigning the transmission to occur in either the signal subband or to operate in more than one subband based on a determination of the channel quality indicator.

2. The method set forth in claim 1, further comprising estimating a channel response for a second subcarrier within the subband by utilizing pilot signals in a second subband and not those in the subband.

3. The method set forth in claim 1, wherein the subband includes only contiguous frequency subcarriers.

4. The method set forth in claim 1, wherein the subband includes non-contiguous frequency subcarriers.

5. A non-transitory machine readable medium having stored thereon instructions to:
   a) transmit a user's symbols in hopping pattern over the full broadband in a wireless OFDMA communication that estimates multiple channels in a MIMO system operating over a given frequency band; determine that a pilot signal in a subband and a neighboring subband have been received at a receiver;
   b) receive a plurality of pilot signals in more than a subband of a frequency band;
   c) receive a channel quality indicator (CQI) indicative of channel quality of each subband observed in a wireless device;
   d) estimate a channel response for a subcarrier within the subband based on some of the plurality of pilot signals received in one subband, for that one subband; and
   e) assigning the transmission to occur in either the signal subband or to operate in more than one subband based on a determination of the channel quality indicator.

6. An apparatus for channel estimation that is more efficient for allocating resources when users' symbols are transmitted in a hopping pattern over the full band comprising:
   a) means for transmitting a user's symbols in a hopping pattern over the full broadband in a wireless OFDM communication that estimates multiple channels in a MIMO system operating over a given frequency band;
   b) means for receiving a plurality of pilot signals in more than a subband of a frequency band;
   c) means for receiving a channel quality indicator (CQI) indicative of channel quality of each subband observed in a wireless device;
   d) means for estimating a channel response for a subcarrier within the subband based on some of the plurality of pilot signals in the subband and the pilot signal in the range of the neighboring subband received in one subband, for that one subband; and
   e) means for assigning the transmission to occur in either the signal subband or to operate in more than one subband based on the determination.

7. The apparatus for channel estimation of claim 6 comprising:
   a receiver front end for receiving a pilot signal in a subband and a neighboring subband of a frequency band, each subband comprises a plurality of subcarriers, and the neighboring subband having an in-range portion defined by a contiguous range of frequencies adjacent to the edge of the subband and an out-of-range portion defined by the remaining frequencies in the neighboring subband, wherein the neighboring subband is outside the subband; and
   a channel estimating module connected with the receiver front end for estimating a channel response for a subcarrier within the subband by using the pilot signal in the in-range portion of the neighboring subband.

8. The apparatus of claim 7 wherein the plurality of subcarriers is a power of two.

9. The apparatus of claim 7 wherein the subband is a part of a partitioned frequency bandwidth.

10. The apparatus of claim 7 wherein the receiver front end is adapted to receive orthogonal frequency division multiplexed symbols.

11. The apparatus of claim 7 wherein the receiver front end is adapted to receive symbols over a MIMO channel.

12. The apparatus of claim 7 wherein the receiver front end is adapted to receive orthogonal frequency division multiple access symbols.

13. The apparatus of claim 7 wherein a hopping pattern is restricted to the subband.

14. The apparatus of claim 7 wherein subcarriers near the edge of the subband are not blanked out.

* * * * *